United States Patent [19]
Sato et al.

[11] Patent Number: 5,422,455
[45] Date of Patent: Jun. 6, 1995

[54] ELECTRICAL DISCHARGE MACHINE WITH SECONDARY ELECTRODE FOR CORROSION PREVENTION

[75] Inventors: Seiji Sato; Takuji Magara; Hisashi Yamada, all of Aichi, Japan

[73] Assignee: Mitsubishi Denki Kabushiki Kaisha, Tokyo, Japan

[21] Appl. No.: 13,049

[22] Filed: Feb. 4, 1993

[30] Foreign Application Priority Data

Feb. 7, 1992 [JP] Japan ............... 4-022506

[51] Int. Cl.6 ................................ B23H 1/02
[52] U.S. Cl. .................. 219/69.13; 219/69.12
[58] Field of Search .......... 219/69.12, 69.13, 69.17, 219/69.18

[56] References Cited

U.S. PATENT DOCUMENTS 4,678,884 7/1987 Obara et al. ............. 219/69.13

FOREIGN PATENT DOCUMENTS

| | | |
|---|---|---|
| 58-137524 | 8/1983 | Japan . |
| 59-232726 | 12/1984 | Japan ............. 219/69.13 |
| 61-192415 | 8/1986 | Japan . |
| 63-68317 | 3/1988 | Japan . |
| 2-30431 | 1/1990 | Japan ............. 219/69.13 |
| 3-136719 | 6/1991 | Japan ............. 219/69.13 |
| 3-265882 | 10/1991 | Japan ............. 219/69.17 |
| 637224 | 12/1978 | U.S.S.R. ............. 219/69.13 |
| 657945 | 4/1979 | U.S.S.R. ............. 219/69.18 |
| 8504353 | 10/1985 | WIPO ............. 219/69.13 |
| 9214575 | 9/1992 | WIPO . |

Primary Examiner—Geoffrey S. Evans
Attorney, Agent, or Firm—Sughrue, Mion, Zinn, Macpeak & Seas; Richard C. Turner; Peter A. McKenna

[57] ABSTRACT

An electric discharge machining apparatus of the travelling wire or sink type includes at least one secondary electrode which is immersed in the dielectric at least during machining. A microvoltage power supply is used to create a micropotential difference between the workpiece and the secondary electrode so that the workpiece becomes a negative pole. Maintaining this arrangement both during machining and non-machining times prevents the workpiece from being subjected to positive-pole oxidation.

7 Claims, 7 Drawing Sheets

ELECTRICAL DISCHARGE MACHINE WITH SECONDARY ELECTRODE FOR CORROSION PREVENTION

BACKGROUND OF THE INVENTION

1. Field of the Invention

The present invention relates to an improvement in an electrical discharge machine, and particularly to an electrical discharge machine which prevents a workpiece from oxidizing and rusting during machining setup or a machining operation, thereby contributing to machined surface quality.

2. Description of the Background Art

In known electrical discharge machining using an aqueous dielectric fluid, oxygen dissolved in the dielectric fluid may affect a workpiece, generating an oxidized layer, rust, etc., in the surface of the workpiece. It is known that among workpieces made of ferrous (Fe) materials, those of S55C, NAC and other materials are especially easily rusted. Also, raw materials are more easily rusted than hardened ones. It is also known that among workpieces made of non-ferrous materials, titanium (Ti) and others oxidize at the surface, changing in color. In addition to the influence on the materials as described above, oxidization and/or rusting involves the following various factors:

(1) Oxidization and/or rusting is apt to progress when the dielectric fluid is not flowing, or is in a rest state, as compared to when it is flowing.

(2) Oxidization and/or rusting is more apt to progress as the electrical conductance of the dielectric fluid becomes lower.

(3) Oxidization and/or rusting is hastened when a potential difference is impressed from outside so that the workpiece becomes a positive pole (positive pole oxidization).

To prevent the workpiece surface from rusting, as disclosed in, for example, Japanese Patent Publication No. 137524 of 1983, the negative pole of an auxiliary power supply provided separately from an electrical discharge machining power supply is connected to a workpiece, with the positive pole thereof (in contact with a dielectric fluid) connected to the workpiece via the dielectric fluid and a workpiece mounting table, whereby the workpiece becomes a negative pole and rust is prevented.

An electrical discharge machine known in the art will now be described with reference to FIG. 10, which illustrates the arrangement of a commonly known wire-cut electrical discharge machine. The numeral 1 indicates a wire electrode, 2 a workpiece, 3 a wire bobbin, 4a and 4b upper and lower dielectric fluid nozzles, respectively, and 5 an electrical feeder for feeding the wire electrode 1 with electricity, 6 tension rollers for providing the wire electrode 1 with tension, 8 a machining power supply for supplying a machining current to a machining gap formed between the wire electrode 1 and the workpiece 2, 13 an auxiliary power supply, 14 a secondary electrode (float electrode), 15 a machining tank, and 16 a surface plate for securing the workpiece 2. Auxiliary power supply 13 is a battery power supply which is lower in voltage, e.g., approximately 9V, than the machining power supply 8, and the negative pole thereof is connected to the workpiece 2 and the positive pole thereof to the secondary electrode 14 floating on the surface of a dielectric fluid.

The operation of said machine according to the prior art will now be described. Referring to FIG. 10, the wire electrode 1 runs under tension which is imparted by the tension rollers 6, and the machining current is supplied to the wire electrode 1 by the machining power supply 8 through the electrical feeder 5. The machining gap formed by the workpiece 2 and the wire electrode 1 is supplied with pure water, which acts as the dielectric fluid, or an aqueous dielectric fluid, which includes silicon or polymer compounds, etc., as additives, through the dielectric fluid nozzles 4a, 4b from the top and bottom. A discharge is generated across the machining gap, thereby machining the workpiece 2. During non-machining intervals, a microcurrent flows from the auxiliary power supply 13, to the secondary electrode 14, the dielectric fluid, the surface plate 16 and the workpiece 2 in this sequence. As described above, when the electrical discharge machining comes to a stop, the microcurrent supplied by the auxiliary power supply 13 causes the workpiece 2 to be a negative pole and stops the oxidization of the workpiece 2, preventing rusting.

The electrical discharge machine of the prior art arranged as described above prevents the workpiece from oxidizing during non-machining times such as setup, preparation and post-machining periods but cannot prevent the workpiece from oxidizing during machining. Also, when the electrical conductance of the dielectric fluid has become high before, during and after the machining time, the secondary electrode is eroded by electrolytic action and deposits may form on the workpiece surface. Conversely, when the electrical conductance of the dielectric fluid has become low, the current flowing between the secondary electrode and the workpiece decreases, reducing the effect of preventing the workpiece from oxidizing and rusting. Particularly when the electrical conductance has increased during the machining time, the deposition of the secondary electrode material on the workpiece adversely affects machining velocity and machining accuracy. To prevent this, the current flowing between the workpiece and the secondary electrode must be maintained at an optimum value.

SUMMARY OF THE INVENTION

It is accordingly an object of the present invention to overcome the disadvantages in the prior art by providing an electrical discharge machine which prevents a workpiece from oxidizing and rusting whether during non-machining or machining time by creating a micropotential difference of about several volts between a workpiece and a secondary electrode so that the workpiece becomes a negative pole also during machining. It is another object of the present invention to provide an electrical discharge machine which maintains a current flowing between a workpiece and a secondary electrode at an optimum value if the electrical conductance of a dielectric fluid changes.

DESCRIPTION OF THE PREFERRED EMBODIMENT

Figure 1:
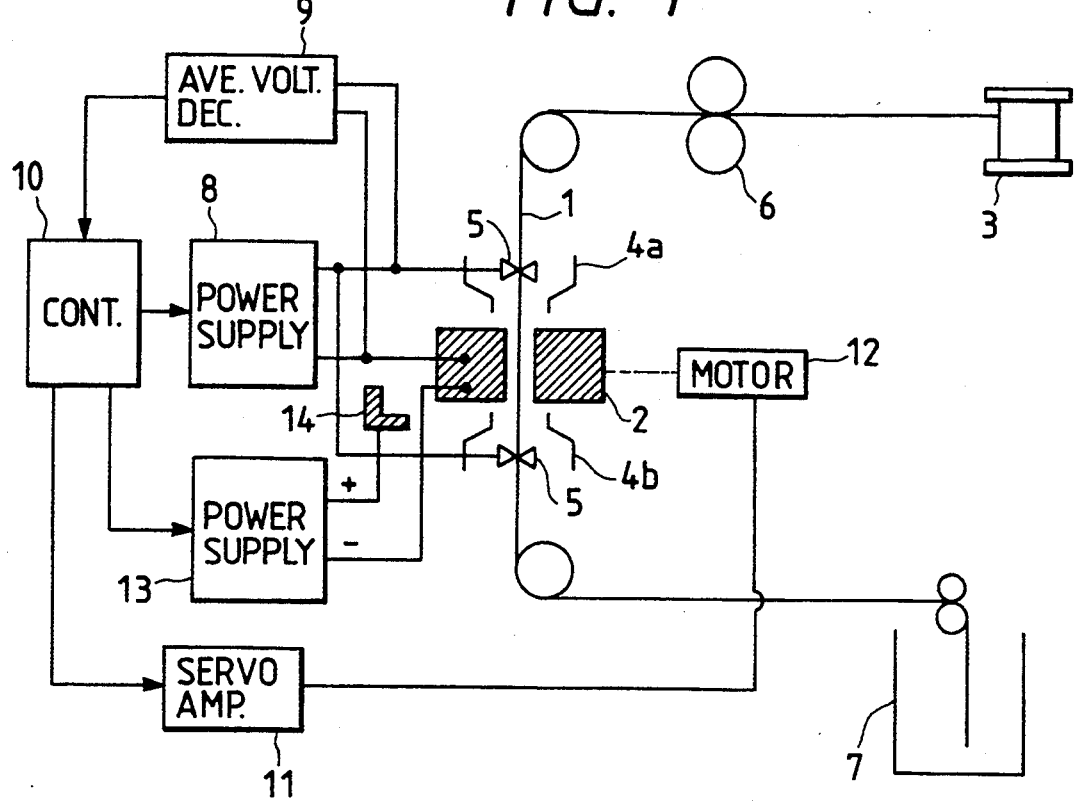
FIG. 1 illustrates a preferred embodiment of the invention.

Embodiments of the invention will now be described with reference to the appended drawings. FIG. 1 shows an embodiment of the invention, wherein the numeral 1 indicates a wire electrode, 2 a workpiece, 3 a wire bobbin, 4a and 4b, upper and lower dielectric fluid nozzles, respectively, 5 an electrical feeder for feeding the wire electrode 1 with electricity, 6 tension rollers for providing the wire electrode 1 with tension, 7 a used wire electrode collecting box, 8 a machining power supply for supplying a machining gap with a machining current which will zero an average machining voltage, e.g., a bipolar pulse voltage, 9 an average voltage detector circuit for detecting the average machining voltage at the machining gap, 10 a controller for calculating a machining feedrate from the result of the average voltage detector circuit 9 and for exercising machining feed control, 11 a servo amplifier, 12 a drive motor for moving the workpiece 2 and its supporting XY cross table (not shown) in X and Y directions concurrently, 13 a power supply circuit for applying a microvoltage between a secondary electrode 14 and the workpiece 2 during non-machining times under the command of the controller 10, and 14 a secondary electrode opposed to the workpiece 2 with a dielectric fluid in between and electrically isolated from the wire electrode 1.

The operation of the machine according to the present embodiment shown in FIG. 1 will now be described. As in the prior art machine, the wire electrode 1 runs under tension provided by the tension rollers 6, and a machining current is supplied to the wire electrode 1 by the machining power supply 8 through the electrical feeder 5. The machining gap formed by the workpiece 2 and the wire electrode 1 is supplied with pure water, which serves as the dielectric fluid, or an aqueous dielectric fluid, which may include polymer compounds, silicon etc., as additives, through the dielectric fluid nozzles 4a, 4b from the top and bottom, and a discharge is generated in the machining gap, thereby carrying out machining. Machining feed is controlled to render the value of the average machining voltage, as detected during machining by the average voltage detector circuit 9, equal to a preset voltage. It should be noted, however, that if the average machining voltage is zeroed during machining in the present invention, the detected value obtained by the full-wave or half-wave rectification of the average machining voltage will be compared with the preset voltage. An average voltage at the machining gap higher than the preset voltage indicates that the machining gap has increased, and the controller 10 commands the servo amplifier 11 to increase the machining feedrate and so drives the drive motor 12. An average voltage at the machining gap which is lower than the preset voltage indicates that the machining gap has decreased, and the controller 10 commands the servo amplifier 11 to reduce the machining feedrate and drive the drive motor 12 accordingly.

Because a bipolar pulse voltage is supplied to the machining gap as a machining voltage during the above operation, the average machining voltage is zeroed. In such a case, a microvoltage can be kept imposed between the secondary electrode 14 and the workpiece 2 if the controller 10 operates the power supply circuit 13 during machining. The workpiece 2 thus becomes a negative pole. Also, during non-machining time, a similar operation allows a microvoltage to be imposed between the secondary electrode 14 and the workpiece 2. If this DC voltage is too high, an electrolytic action will be increased, progressing the erosion of the secondary electrode. Hence, the DC voltage may generally be as slight as 2 to 10V at a dielectric fluid conductance of 10S. This suppresses the positive pole oxidization of the workpiece 2 during machining and non-machining periods, preventing rust from progressing.

Figure 2:
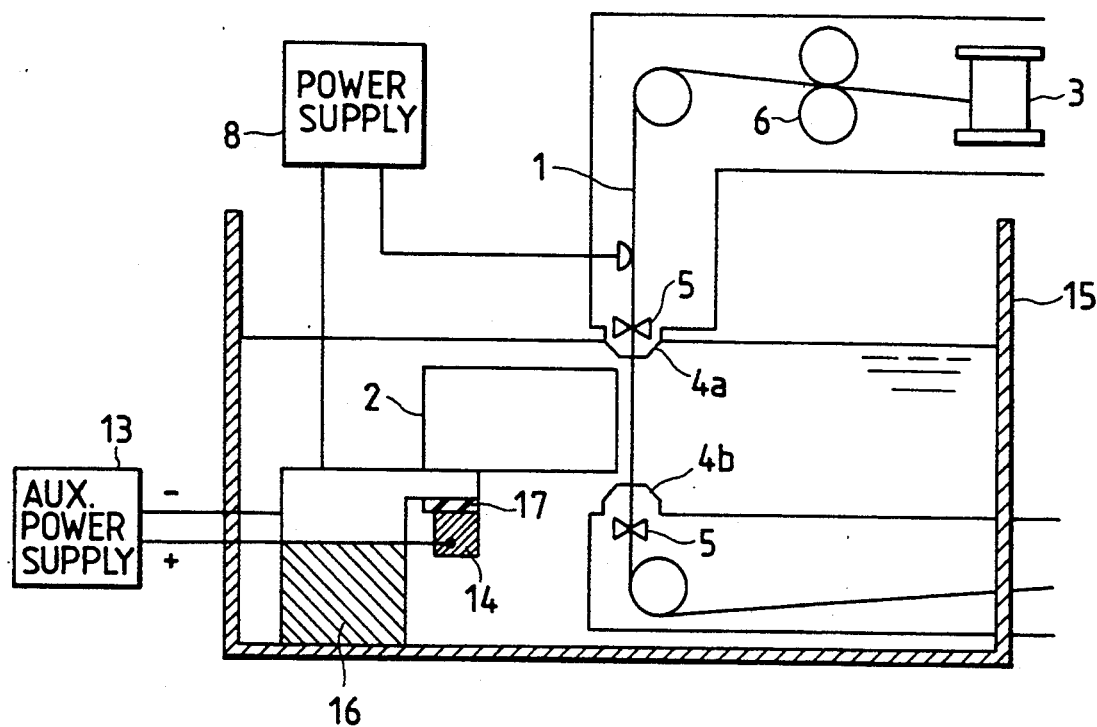
FIG. 2 illustrates a preferred secondary electrode installation method for the first invention.

FIG. 2 shows a secondary electrode installation technique, wherein the reference characters 1 to 6, 8, 13 and 14 designate like or corresponding parts to those in the embodiment in FIG. 1, 15 indicates a machining tank, 16 a surface plate for securing the workpiece, and 17 an insulating plate for electrically isolating the secondary electrode 14 and the surface plate 16.

Figure 3:
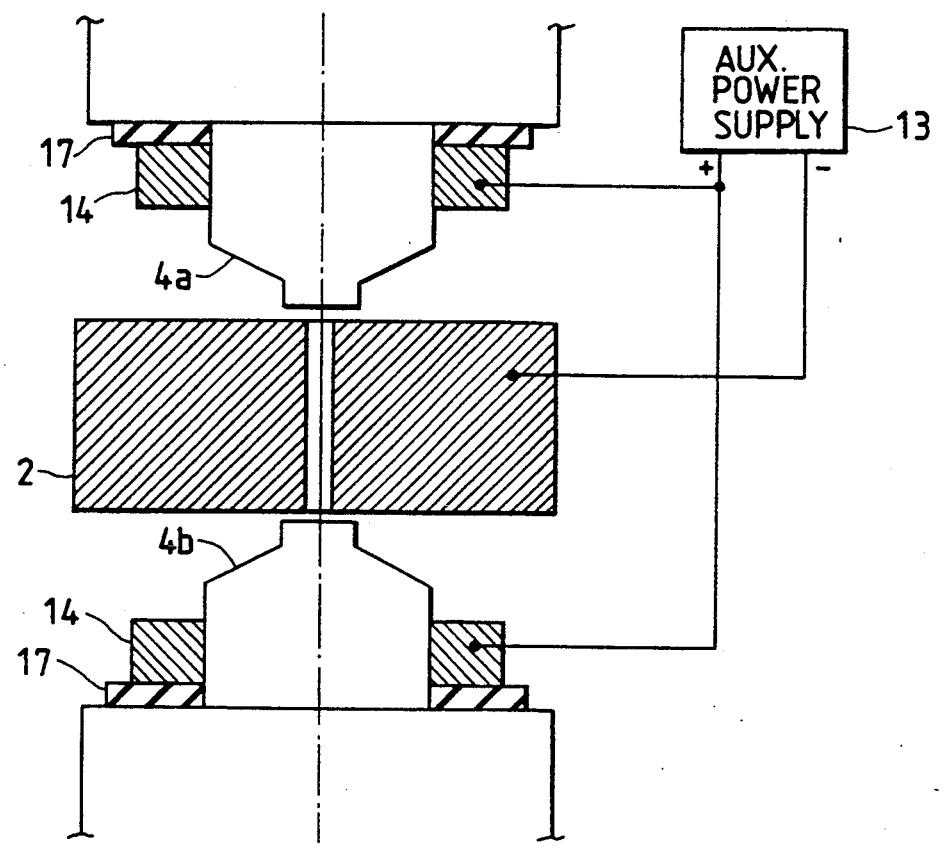
FIG. 3 illustrates another preferred embodiment of the secondary electrode installation method.

FIG. 3 shows another secondary electrode installation technique, wherein secondary electrodes 14 are mounted adjacent to the dielectric fluid nozzles 4a, 4b and electrically isolated from the wire electrode 1 by the dielectric fluid nozzles 4a, 4b and the insulating plates 17.

The arrangements shown in FIGS. 2 and 3 will now be described. In FIG. 2, the secondary electrode 14 is installed on the surface plate 16 via the insulating plate 17. Since this installation is easy, the number of secondary electrodes 14 can be adjusted according to the size of the machining tank 15. Also when a secondary electrode 14 has been consumed, it can be changed easily. In FIG. 3, the secondary electrodes 14 are installed above and below the gap, on dielectric fluid nozzles 4a, 4b. While the wire electrode 1 is in any position inside the machining tank 15, therefore, the secondary electrodes 14 can be adjacent to the workpiece 2, and the distances between the workpiece 2 and the secondary electrodes 14 can be made constant. The secondary electrodes 14 may be installed in any other positions than those shown in the embodiments in FIGS. 2 and 3, if within the machining tank 15, to produce a like effect.

Figure 4:
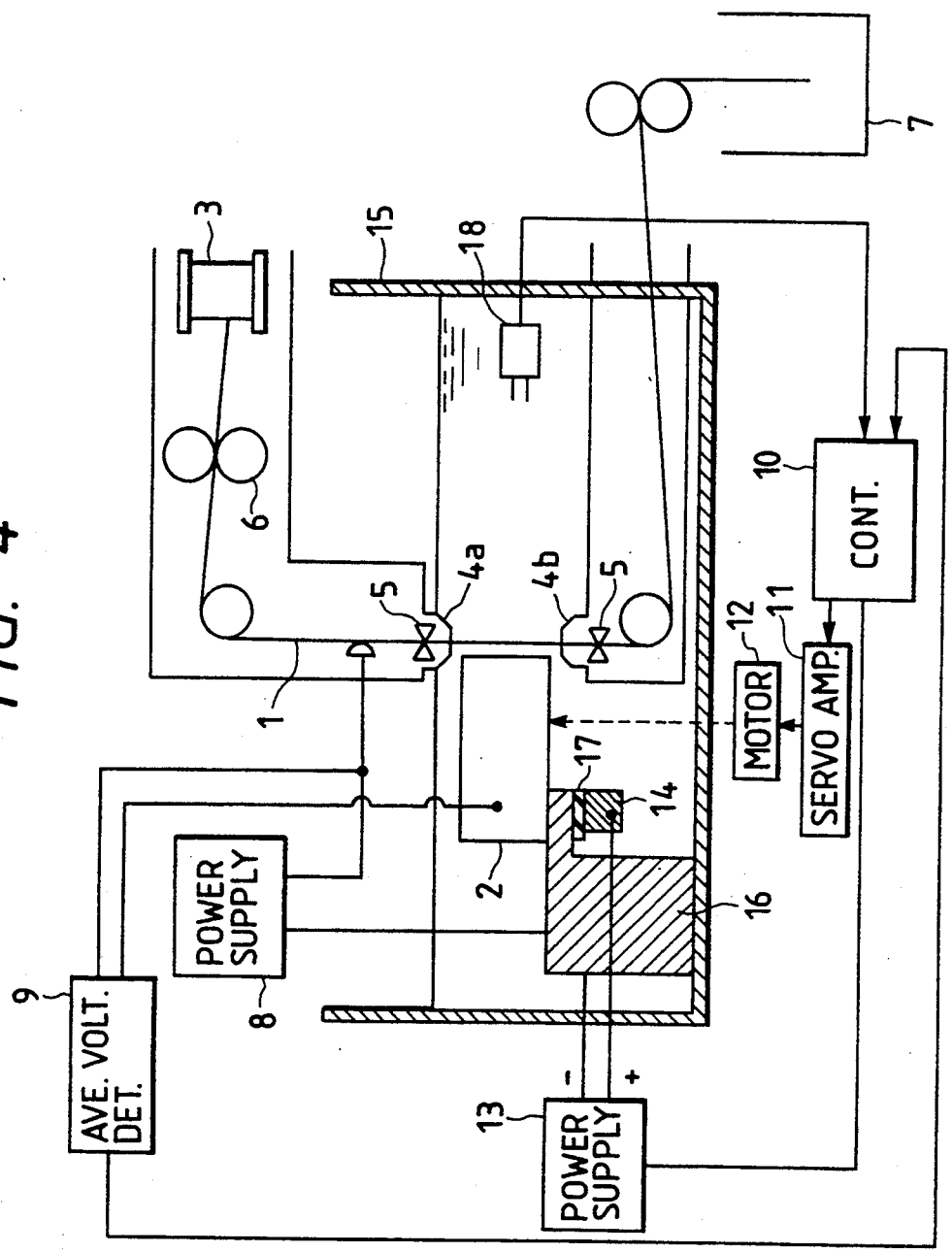
FIG. 4 illustrates a second preferred embodiment.

A second embodiment will now be described with reference to the appended drawings. FIG. 4 illustrates the second embodiment, wherein the numeral 1 indicates a wire electrode, 2 a workpiece, 3 a wire bobbin, 4a and 4b, upper and lower dielectric fluid nozzles, respectively, 5 an electrical feeder for feeding the wire electrode 1 with electricity, 6 tension rollers for tensioning the wire electrode 1, 7 a used wire electrode collecting box, 8 a machining power supply for supplying a voltage to a machining gap formed by the wire electrode 1 and the workpiece 2, 9 an average voltage detector circuit for detecting the average machining voltage at the machining gap, 10 a controller for calculating a machining feedrate from the output of the average voltage detector circuit 9 and carrying out machining feed control, 11 a servo amplifier, 12 a drive motor for moving the workpiece 2 fixed to an XY cross table (not shown) in X and Y directions concurrently, 13 a power supply circuit for changing an output impedance according to the electrical conductance of a dielectric fluid and applying a DC microvoltage to a secondary electrode 14 and the workpiece 2, 15 a machining tank, 16 a surface plate for fixing the workpiece 2, 17 an insulating plate for isolating the secondary electrode 14 from the surface plate 16, and 18 a conductance meter for measuring the electrical conductance of the dielectric fluid.

Figure 5:
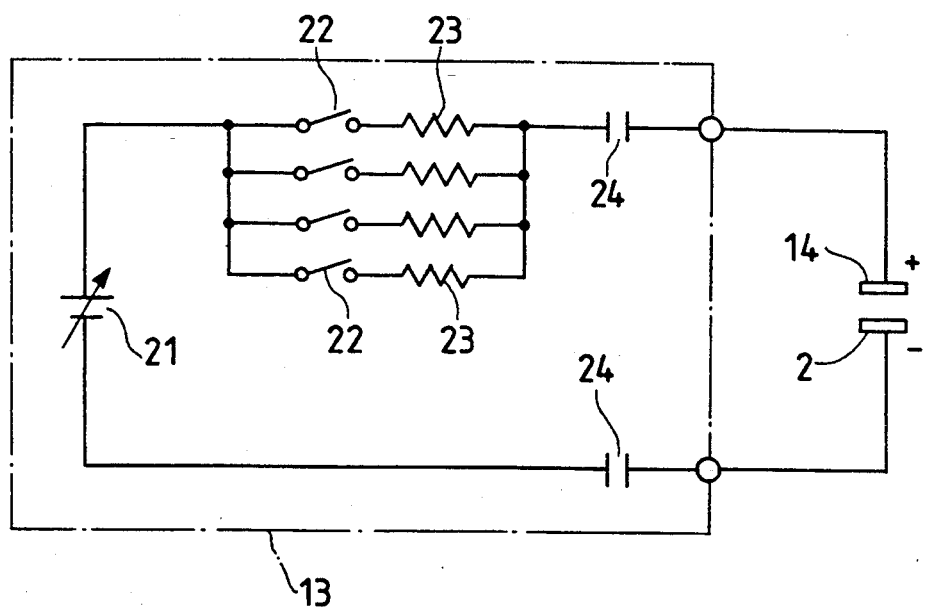
FIG. 5 illustrates a preferred embodiment of a circuit for changing an output impedance in the second embodiment.

FIG. 5 illustrates an example of the power supply circuit 13 in FIG. 4. In FIG. 5, 2 indicates a workpiece, 14 a secondary electrode, 21 a DC power supply for applying a voltage to the secondary electrode 14 and the workpiece 2, 22 switching devices for switching the output impedance according to the electrical conductance of the dielectric fluid, 23 impedance devices selected according to the electrical conductance of the dielectric fluid, and 24, relays.

The operation of the machine shown in FIG. 4 will now be described. As described in the embodiment of the first invention, the wire electrode 1 runs under tension provided by the tension rollers 6, and a machining current is supplied to the wire electrode 1 by the machining power supply 8 through the electrical feeder 5. The machining gap formed by the workpiece 2 and the wire electrode 1 is supplied with pure water, which acts as the dielectric fluid, or an aqueous dielectric fluid, which may include silicon, polymer compounds, etc., as additives, through the dielectric fluid nozzles 4a, 4b from the top and bottom, and a discharge is generated in the machining gap, whereby the workpiece 2 is machined. Machining feed is controlled to render the value of the average machining voltage detected during machining time by the average voltage detector circuit 9 connected to the machining gap equal to a preset voltage. Namely, since the average voltage at the machining gap higher than the preset voltage shows that the machining gap has increased, the controller 10 commands the servo amplifier 11 to increase the machining feedrate and accordingly drives the drive motor 12. Inversely, since an average voltage at the machining gap lower than the preset voltage indicates that the machining gap has decreased, the controller 10 commands the servo amplifier 11 to reduce the machining feedrate and so drives the drive motor 12.

During non-machining time, e.g., during setup or post-machining periods, when the above machining operation is not performed, the controller 10 detects a change in the electrical conductance of the dielectric fluid by means of the conductance meter 18, causes the power supply circuit 13 to operate, switches the output impedance of the power supply circuit 13 according to the electrical conductance of the dielectric fluid, and applies a DC microvoltage between the secondary electrode 14 and the workpiece 2 so that the workpiece 2 becomes a negative pole. The power supply circuit 13 operates under control of controller 10 to select one of the impedances corresponding to the then-detected electrical conductance of the dielectric fluid. The DC power supply 21 generates from 2 to 10 volts under control of the controller 10. The controller 10 thus operates such that a constant current flows between the secondary electrode 14 and the workpiece 2. Circuit 13 connects the selected impedance device 23 with the corresponding switching device 22, and applies the DC microvoltage to the secondary electrode 14 and the workpiece 2. On/off of the power supply circuit 13 is selected by the relays 24. The above operation can enhance suppression of the positive pole oxidization of the workpiece 2, and if the electrical conductance of the dielectric fluid is high, allows the current flowing between the secondary electrode 14 and the workpiece 2 to be limited, thereby preventing the secondary electrode 14 from being consumed due to an overflow current.

Figure 6:
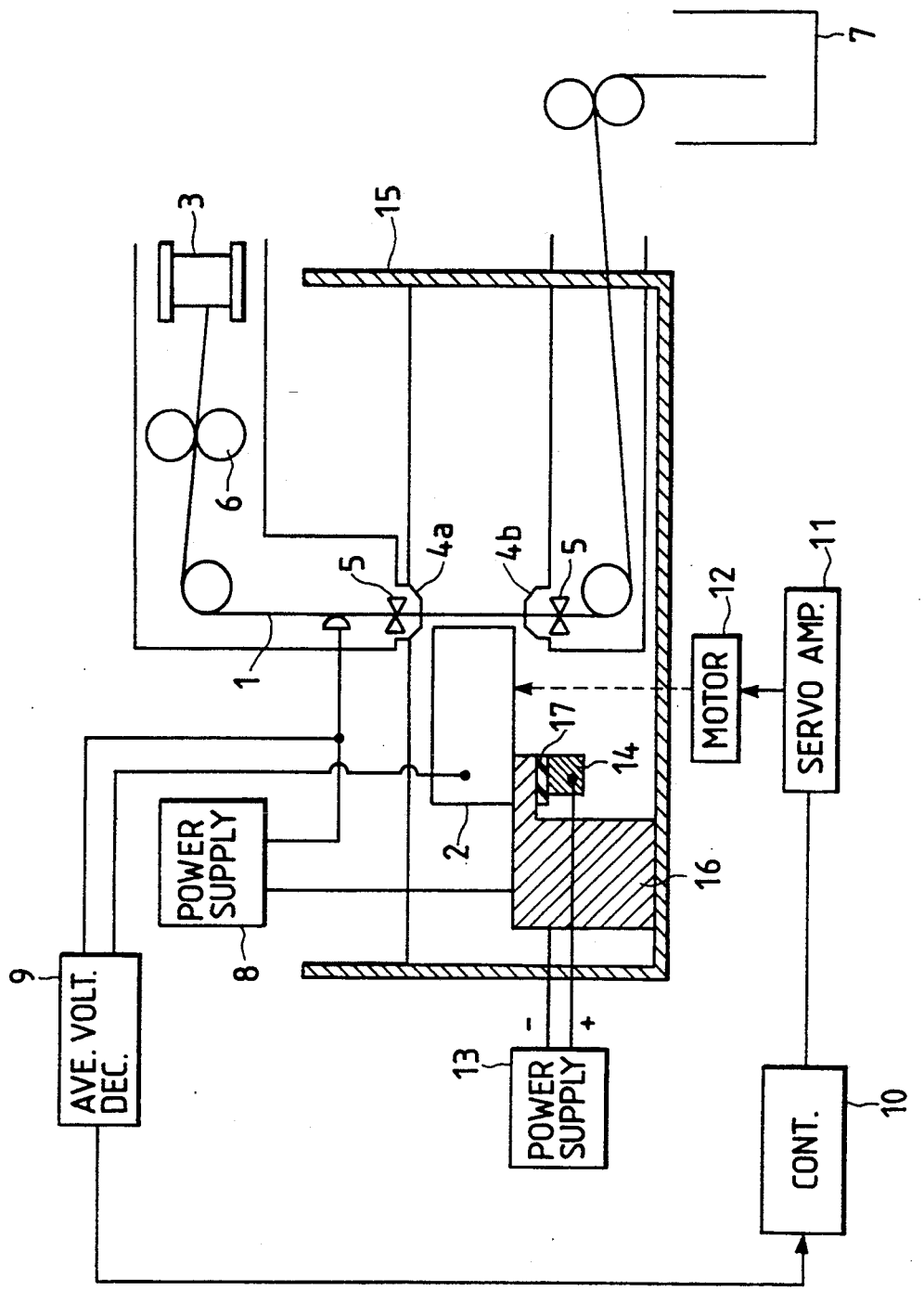
FIG. 6 illustrates a third preferred embodiment.
Figure 7:
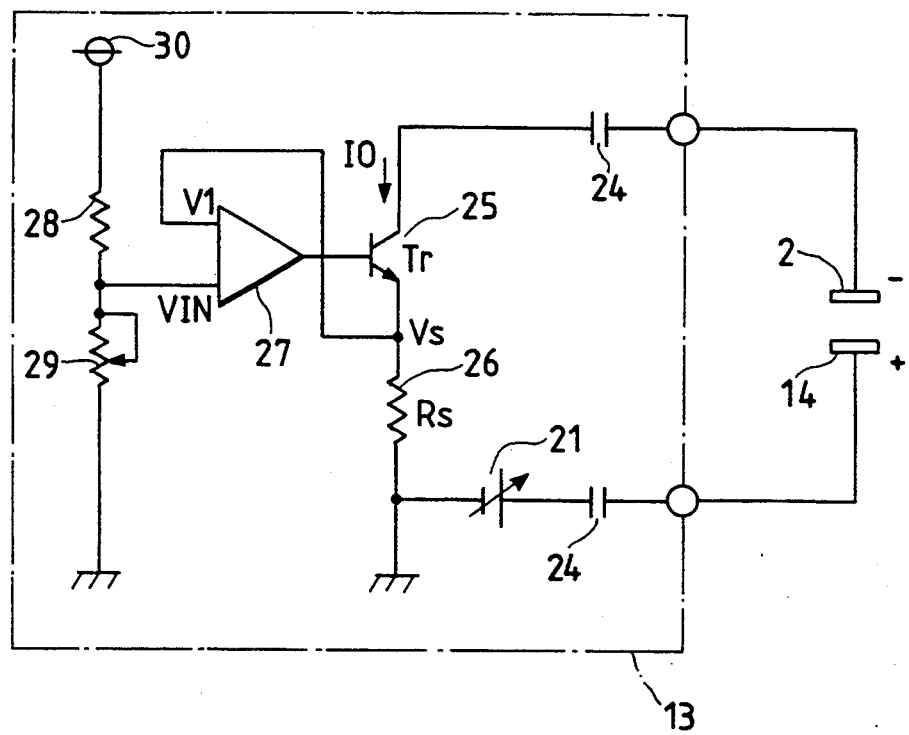
FIG. 7 illustrates a preferred embodiment of a constant-current power supply circuit in the third embodiment.
Figure 10:
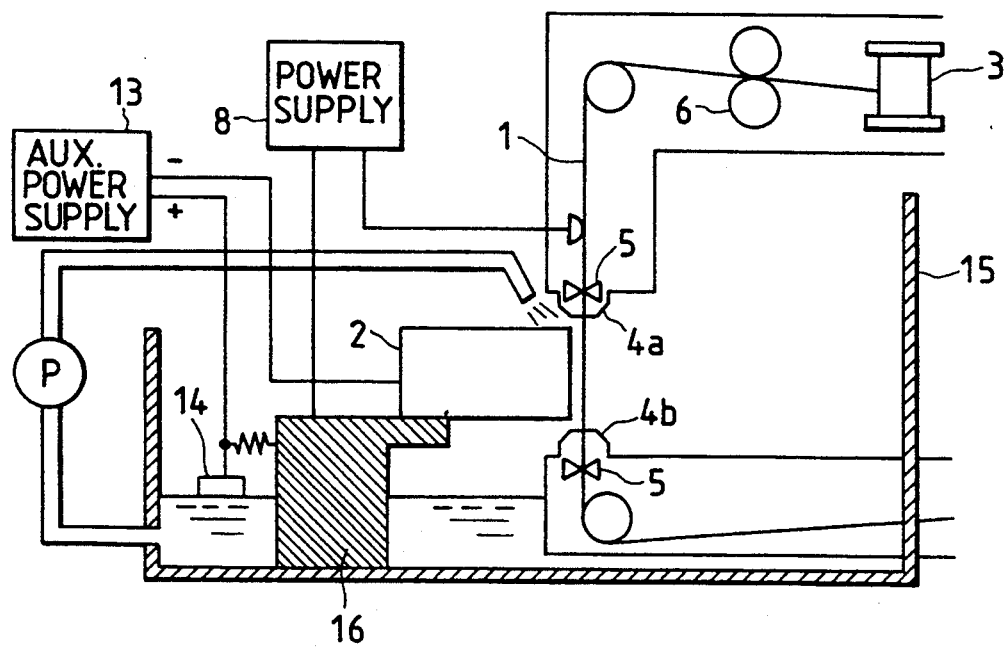
FIG. 10 illustrates the prior art secondary electrode technique.

FIG. 6 shows a third embodiment, wherein numerals 1 to 17 identify parts corresponding to those in the preceding embodiment. FIG. 7 illustrates an example of the power supply circuit 13 in FIG. 6. In FIG. 7, 14 indicates a secondary electrode, 2 a workpiece, 21 a DC power supply for imposing a voltage to the secondary electrode 14 and the workpiece 2, 24 relays, 25 a transistor for regulating a current flowing between the secondary electrode 14 and the workpiece 2, and 26 a resistor for limiting a current flowing in the circuit. Further, 27 indicates an operational amplifier, 28 a fixed resistor, 29 a variable resistor, and 30 a reference power supply. The voltage value of the reference power supply 30 divided by the fixed resistor 28 and the variable resistor 29 is input to one input voltage terminal VIN of the operational amplifier 27, and the other input voltage terminal V1 of the operational amplifier 27 is connected to node Vs.

The operation of the apparatus shown in FIG. 6 will now be described. As described in the first embodiment, the wire electrode 1 runs under tension applied by the tension rollers 6, and a machining current is supplied to the wire electrode 1 by the machining power supply 8 through the electrical feeder 5. The machining gap formed by the workpiece 2 and the wire electrode 1 is supplied with pure water, which acts as the dielectric fluid, or an aqueous dielectric fluid, which may include polymer compounds, etc. as additives, through the dielectric fluid nozzles 4a, 4b from the top and bottom, and a discharge is generated in the machining gap, whereby machining is performed. Machining feed is controlled to render the value of the average machining voltage detected during machining times by the average voltage detector circuit 9 connected to the machining gap equal to a preset voltage. Since an average voltage at the machining gap higher than the preset voltage indicates that the machining gap has increased, the controller 10 commands the servo amplifier 11 to increase the machining feedrate and so drives the drive motor 12. Conversely, since the average voltage at the machining gap lower than the preset voltage indicates that the machining gap has decreased, the controller 10 commands the servo amplifier 11 to reduce the machining feedrate and so drives the drive motor 12.

During non-machining times, e.g., during setup or post-machining periods, when the above machining operation is not carried out, the power supply circuit 13 operates to impose a DC microvoltage between the secondary electrode 14 and the workpiece 2 so that the workpiece 2 becomes a negative pole. On/off of the power supply circuit 13 is controlled by relays 24. Although the current flowing between the secondary electrode 14 and the workpiece 2 changes with the electrical conductance of the dielectric fluid and the like, the power supply circuit 13 controls that current so as to be constant. Namely, the current $I0$ flowing in the circuit in FIG. 7 is given by $$I0 = Vs/Rs$$

and assuming that V1=Vs and V1=VIN, $$IO = VIN/Rs$$

and the current in the circuit is constant. Hence, by regulating the input voltage VIN, a desired constant current can be supplied between the secondary electrode 4 and the workpiece 2. This reliably suppresses the positive pole oxidization of the workpiece 2, and if the electrical conductance of the dielectric fluid is high, can prevent the secondary electrode 14 from consumption due to an overflow current.

Figure 8:
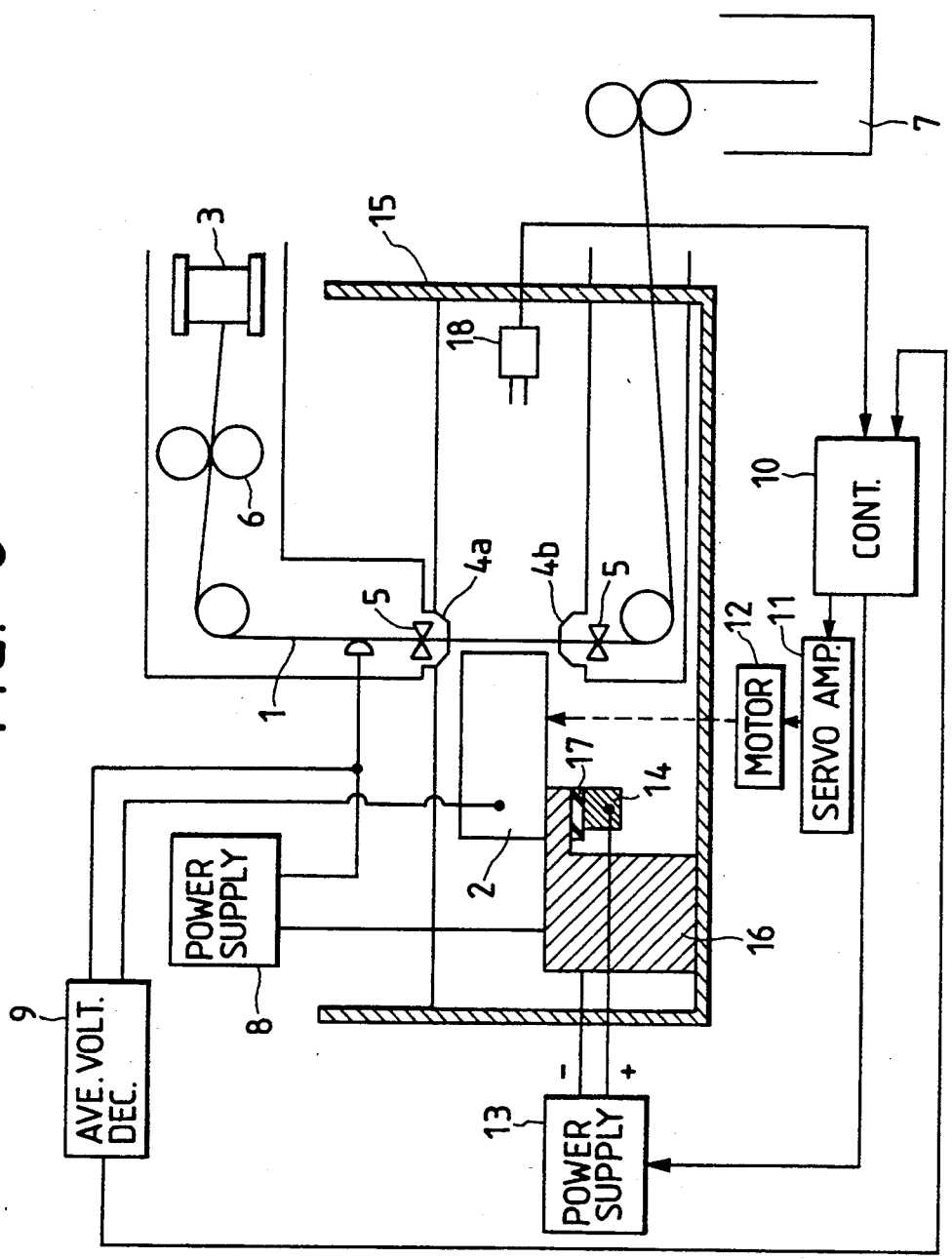
FIG. 8 illustrates a fourth preferred embodiment.

FIG. 8 shows a further embodiment, wherein a machining power supply 8 supplies a machining gap with a bipolar pulse voltage which will zero an average machining voltage. The machine in this embodiment also provides the same effect during machining as produced by the second invention.

Figure 9:
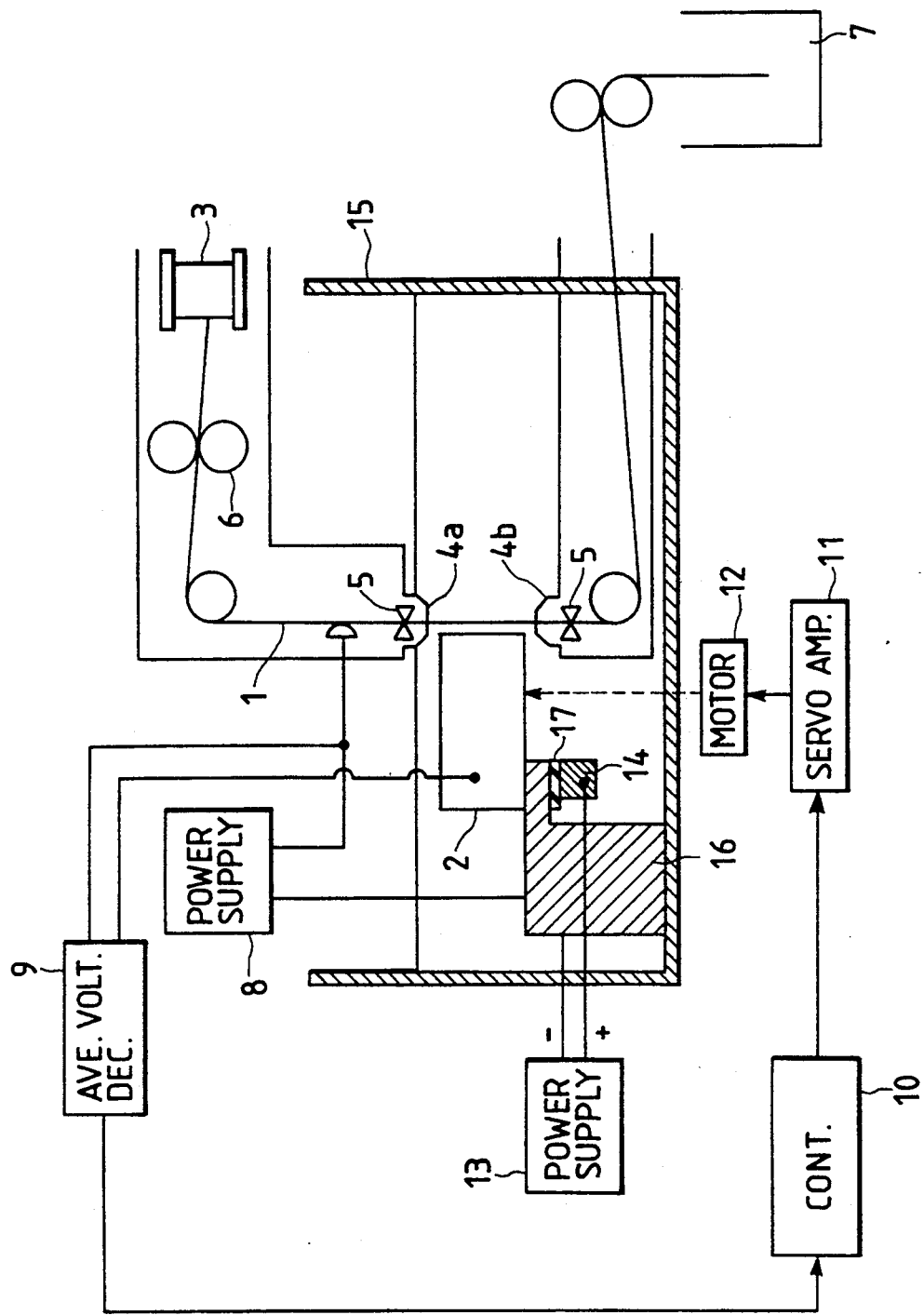
FIG. 9 illustrates another variant of the fourth embodiment.

FIG. 9 illustrates another embodiment, wherein a machining power supply 8 supplies a machining gap with a bipolar pulse voltage which will zero an average machining voltage. The machine in this embodiment also provides the same effect during machining as produced by the third embodiment.

It will be apparent that the electrical discharge machine of the invention comprises a machining power supply for supplying a machining gap with a bipolar voltage which will zero an average machining voltage, a secondary electrode opposed to a workpiece with a dielectric fluid in between, and a microvoltage power supply for providing a micropotential difference between the workpiece and the secondary electrode so that the workpiece becomes a negative pole during machining and/or non-machining periods, whereby the workpiece becomes a negative pole and rust generated due to positive pole oxidization can be prevented.

It will also be apparent that the electrical discharge machine of the invention includes a secondary electrode opposed to a workpiece with a dielectric fluid in between, a microvoltage power supply for creating a micropotential difference between the workpiece and secondary electrode so that the workpiece becomes a negative pole, a detecting device for detecting the electrical conductance of the dielectric fluid between the workpiece and secondary electrode, and a switching device for switching the output impedance of the microvoltage power supply in response to the output of said detecting means, whereby a current flowing between the secondary electrode and the workpiece by the application of the microvoltage can be kept constant if the electrical conductance of the dielectric fluid changes, and an effect can be produced to prevent oxidization and/or rust from being generated. Also, the machine prevents the negative pole from being eroded due to an overflowing current, and metal ions from being deposited on the workpiece.

The electrical discharge machine of the third embodiment further comprises a secondary electrode opposed to a workpiece with a dielectric fluid inbetween and a microvoltage power supply for generating a micropotential difference between said workpiece and said secondary electrode so that said workpiece becomes a negative pole, said microvoltage power supply being a constant-current power supply, whereby a current flowing between the secondary electrode and the workpiece by the application of the microvoltage can be kept constant if the electrical conductance of the dielectric fluid changes, and an effect can be produced to prevent oxidization and/or rust from being generated. Also, the machine prevents the negative pole from being eroded due to an overflowing current, and metal ions from being deposited on the workpiece.

It will further be apparent that the inventive electrical discharge machine includes a machining power supply for supplying a machining gap with a bipolar voltage which will zero an average machining voltage in the electrical discharge machine as, whereby an identical effect can be produced whether during a machining or a non-machining period.

To the extent not incompatible, and so long as attaining desired effects of the invention, the various embodiments disclosed herein may also be used in combination.

What is claimed is:

1. An electrical discharge machine employing an aqueous dielectric fluid for machining a workpiece by the application of a voltage across a machining gap formed between a primary electrode and said workpiece, comprising:
   a machining power supply for supplying the machining gap with a bipolar voltage which will zero an average machining voltage;
   a secondary electrode opposed to said workpiece with said dielectric fluid in between; and
   a microvoltage power supply for providing a micropotential difference between said workpiece and said secondary electrode so that said workpiece becomes a negative pole during both a machining and a non-machining time.

2. An electrical discharge machine as defined in claim 1, further including an insulating member between said secondary electrode and a member holding said workpiece.

3. An electrical discharge machine as defined in claim 1, further including upper and lower nozzles surrounding said electrode and supplying dielectric fluid to said gap, said secondary electrode being disposed surrounding at least a portion of at least one of said nozzles.

4. An electrical discharge machine employing an aqueous dielectric fluid for machining a workpiece with the application of a voltage across a machining gap formed between a primary electrode and said workpiece, comprising:
   a secondary electrode opposed to said workpiece with said dielectric fluid inbetween;
   a microvoltage power supply for providing a micropotential difference between said workpiece and said secondary electrode so that said workpiece becomes a negative pole during both a machining and a non-machining time;
   detecting means for detecting the electrical conductance of said dielectric fluid existing between said workpiece and said secondary electrode; and
   switching means for switching the output impedance of said microvoltage power supply in response to the output of said detecting means.

5. An electrical discharge machine as defined in claim 4, wherein the machining power supply supplies the machining gap with a bipolar voltage which will zero an average machining voltage.

6. An electrical discharge machine employing an aqueous dielectric fluid for machining a workpiece by the application of a voltage across a machining gap formed between a primary electrode and said workpiece, comprising:
   a secondary electrode opposed to said workpiece with said dielectric fluid inbetween; and a microvoltage power supply for providing a micropotential difference between said workpiece and said secondary electrode so that said workpiece becomes a negative pole during both a machining and a non-machining time; and wherein said microvoltage power supply is a constant-current power supply.

7. An electrical discharge machine is defined in claim 3, wherein the machining power supply supplies the machining gap with a bipolar voltage which will zero an average machining voltage.

* * * * *